United States Patent
Turcios et al.

(10) Patent No.: US 11,094,211 B2
(45) Date of Patent: Aug. 17, 2021

(54) JUDGMENTAL OVERSTEERING TAXI AID SYSTEM AND METHOD

(71) Applicant: Rockwell Collins, Inc., Cedar Rapids, IA (US)

(72) Inventors: Felix B. Turcios, Cedar Rapids, IA (US); Hannah C. Lehman, College Station, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 253 days.

(21) Appl. No.: 16/437,339

(22) Filed: Jun. 11, 2019

(65) Prior Publication Data
US 2020/0302809 A1 Sep. 24, 2020

Related U.S. Application Data

(63) Continuation-in-part of application No. 16/357,031, filed on Mar. 18, 2019.

(51) Int. Cl.
*G08G 5/06* (2006.01)
*B64C 25/50* (2006.01)

(52) U.S. Cl.
CPC .............. *G08G 5/065* (2013.01); *B64C 25/50* (2013.01)

(58) Field of Classification Search
CPC ................................................. G08G 5/065
See application file for complete search history.

(56) References Cited

U.S. PATENT DOCUMENTS

| | | | | |
|---|---|---|---|---|
| 5,680,125 A | * | 10/1997 | Elfstrom | B64F 1/22 244/1 R |
| 8,478,642 B2 | * | 7/2013 | Dey | G08G 1/096844 705/14.4 |
| 8,855,919 B2 | * | 10/2014 | Tang | G01C 21/3697 701/410 |
| 2005/0004723 A1 | * | 1/2005 | Duggan | B64C 19/00 701/24 |

(Continued)

OTHER PUBLICATIONS

Airbus SAS, Airbus A330 Airplane Characteristics for Airport Planning, Issue: Jan. 1, 1993, Rev: Jan. 1, 2012, 460 pages.

(Continued)

*Primary Examiner* — Alex C Dunn
(74) *Attorney, Agent, or Firm* — Suiter Swantz pc llo

(57) ABSTRACT

A system and method for display of judgmental oversteering taxi data receives a plurality of parameters from aircraft, environmental, position and path sources and determines and displays accurate oversteering data to a pilot. The system enables the pilot to make a variety of taxi turns confident that all aircraft wheels remain on a prepared surface. Aircraft sources include data associated with the aircraft including whether the aircraft has steerable body gear. The environmental parameters include weather, surface friction, and additional data applicable to a turning radius of an aircraft. Position data includes GNSS data to accurately position the aircraft aligned with the taxiways. Path data includes an assigned ATC clearance as well as taxiway data associated with the assigned taxi route. The method compares each of these received variables with stored database information to ensure the aircraft maintains a safe position on the prepared surface during a turn.

20 Claims, 12 Drawing Sheets

(56) References Cited

U.S. PATENT DOCUMENTS

| | | | |
|---|---|---|---|
| 2007/0156294 A1* | 7/2007 | Tipping | G09B 23/06 701/1 |
| 2007/0240056 A1* | 10/2007 | Pepitone | G08G 5/065 715/705 |
| 2007/0241935 A1* | 10/2007 | Pepitone | G05D 1/0083 340/958 |
| 2015/0154874 A1* | 6/2015 | Murthy | G08G 5/06 701/120 |
| 2015/0279218 A1* | 10/2015 | Irrgang | G08G 5/0056 701/3 |
| 2015/0298817 A1* | 10/2015 | Jackson | G08G 5/065 701/3 |
| 2017/0030734 A1* | 2/2017 | Shafaat | G08G 5/0008 |
| 2018/0096225 A1* | 4/2018 | Liu | G06K 9/4604 |
| 2019/0129934 A1* | 5/2019 | Kadav | G06N 3/0445 |
| 2019/0235503 A1* | 8/2019 | Minami | G05D 1/0202 |
| 2020/0027362 A1* | 1/2020 | Dame | G05D 1/0202 |

OTHER PUBLICATIONS

Airbus, Airport and Maintenance Planning, printed Feb. 25, 2019 from internet address https://www.airbus.com/aircraft/support-services/airport-operations-and-technical-data/aircraft-characteristics.html, 1 page.

Airports Council International, About ACI, printed Feb. 25, 2019 from internet address http://www.aci.aero/media/75ef75ac-3ca3-4b10-8b69-dd8f9f346098/About, 3 pages.

Aviation Week, U.S. Airport Runway Incursions, printed on Feb. 22, 2019 at internet address http://aviationweek.com/%5Bprimary-term%5D/us-runway-incursions-airlines-air-taxis, 2 pages.

Best, Jo, IBM Watson: The Inside Story of How the Jeopardy-Winning Supercomputer was Born, and What it Wants to do Next, printed Feb. 25, 2019 from internet address https://www.techrepublic.com/article/ibm-watson-the-inside-story-of-how-the-jeopardy-winning-supercomuter-was-born-and-what-it-wants-to-do-next/, 12 pages.

Blake Shepard, Cycorp, Inc., printed on Feb. 22, 2019 from internet address https://www.researchgate.net/profile/Blake_Shepard, 6 pages.

Boeing, 777-200/300 Airplane Characteristics for Airport Planning, Jul. 1998, 170 pages.

Boeing, 787 Airplane Characteristics for Airport Planning, Apr. 2006, 99 pages.

Boeing, 787 Airplane Characteristics for Airport Planning, Mar. 2018, 180 pages.

Boeing, Formal Distribution of the Boeing 747-8 Airport Compatibility Group Documentation, Nov. 29, 2010, 163 pages.

CiteSeerX, Rapid Object Detection Using a Boosted Cascade of Simple Features (2001), printed on Feb. 22, 2019 from internet address http://citeseerx.ist.psu.edu/viewdoc/summary?doi=10.1.1.10.6807, 1 page.

CNBC, Southwest Plane Slides to Edge of Taxiway in Baltimore Airport: FAA investigating, printed on Feb. 22, 2019 from internet address https://www.cnbc.com/2018/02/07/southwest-plane-slides-to-edge-of-taxiway-in-baltimore-airport-faa-investigating.html, 4 pages.

Federal Aviation Administration, FAA Runway Safety Report, Runway Incursion Trends and Initiatives at Towered Airports in the United States, FY2000-FY2003, 124 pages.

Federal Aviation Administration, Runway Safety Statistics, printed on Feb. 22, 2019 from internet address https://www.faa.gov/airports/runway_safety/statistics/, 2 pages.

Federal Aviation Administration, Runway Safety, Runway Incursions, printed on Feb. 22, 2019 from internet address https://www.faa.gov/airports/runway_safety/news/runway_incursions/, 3 pages.

Full Transcript: Sundar Pichai at Google I/O 2018 Developer Conference, printed Feb. 25, 2019 from internet address https://singjupost.com/full-transcript-sundar-pichai-at-google-i-o-2018-developer-conference/?singlepage=1, 49 pages.

IATA, Current Airline Members, printed on Feb. 22, 2019 from internet address https://www.iata.org/about/members/Pages/airline-list.aspx, 2 pages.

IATA, Safety Report 2017, Issued Apr. 2018, 248 pages.

International Civil Aviation Organization, About ICAO, printed on Feb. 22, 2019 from internet address https://www.icao.it/about-icao, 1 page.

Introduction to the Q-Learning Algorithm, printed on Feb. 22, 2019 from internet address http://mnemstudio.org/path-finding-q-learning.htm, 1 page.

Order of the Minister of Justice of Oct. 4, 2010 for inclusion in the Official Gazette of the text of the Decree on the Supervision of Civil Aviation BES, as amended by the Adjustment Decree on public bodies Bonaire, St. Eustatius and Saba, printed on Feb. 25, 2019 from internet address https://zoek.officielebedendmakingen.nl/stb-2010-632.html?zoekriteria=%3Fzkt%3DUitgebreid%26pst%3Dstaatsblad%26vrt%3D104%26zkd%3DInDeGeheleText%26dpr%3DAlle%26sdt%3DDatumUitgifte%26%20pnr%3D2%26rpp%3D10%26.

Patacciola, Massimiliano, Dissecting Reinforcement Learning—Part 6, Aug. 14, 2017, printed on Feb. 22, 2019 from internet address https://mpatacchiola.github.io/blog/2017/08/14/dissecting-reinforcement-learning-6.html, 45 pages.

Pointers, Pass by Value and Pass by Reference (and Reference Variables), printed on Feb. 22, 2019 from internet address http://www.sstutor.com/cpp/pointer2a.htm, 6 pages.

Skybrary Aviation Safety, Airplane Design Group (ADG), printed on Feb. 22, 2019 from internet address https://www.skybrary.aero/index.php/Airplane_Design_Group_(ADG), 3 pages.

Skybrary Aviation Safety, ICAO Aerodrome Reference Code, printed on Feb. 22, 2019 from internet address https://www.skybrary.aero/index.php/ICAO_Aerodrome_Reference_Code, 5 pages.

Stroustrup, Bjarne, Programming Principles and Practice Using C, Second Edition, copyright 2014 Pearson Education, Inc. 137 pages.

* cited by examiner

JUDGMENTAL OVERSTEERING TAXI AID SYSTEM AND METHOD

CROSS-REFERENCE TO RELATED APPLICATIONS

The present application is a Continuation in Part and claims the benefit under 35 U.S.C. § 120 Of U.S. patent application Ser. No. 16/357,031, Entitled Autonomous Judgmental Oversteering Determination System for Aircraft Taxiing filed Mar. 18, 2019, which is incorporated herein by reference.

BACKGROUND

Surface operations present unique challenges for large aircraft even under good weather and visibility conditions. One such challenge is navigating tight turns where the flight crew will need to overshoot the painted centerline markings and use their judgement to determine where to initiate the turn, at what speed, and at what rate. This operation may be referred to as "judgmental oversteering" and is necessary because the size and turning radius of the large aircraft may result in one or more of the landing gear leaving the prepared taxi surfaces if the crew were to simply align the nose along, and follow the yellow painted turn centerline.

In the current environment, successful judgmental oversteering depends on pilot experience with the specific aircraft type including rules of thumb learned during training. For example, for some aircraft types the pilot taxiing will use the pilot monitoring as a sighting aide of sorts, drawing a mental line through the pilot monitoring and some external reference visible through the windscreen, to have an idea of where to start a judgmental oversteering turn.

This level of experience may or may not be present in each pilot assigned to taxi a large aircraft. Further, during night or reduced visibility operations, visual cues normally usable may be obscured increasing the chance of a taxi excursion.

Therefore, a need remains for a system and related method which may overcome these limitations and provide a flight crew with information that will assist in the consistent and successful execution of a judgmental oversteering operation.

SUMMARY

In one aspect, embodiments of the inventive concepts disclosed herein are directed to a system for displaying a taxi oversteering direction. The system may comprise a receiver configured to receive a plurality of parameters associated with an aircraft taxi operation, the plurality of parameters including at least one of: an aircraft parameter, an environment parameter, a position parameter and a path parameter. The system may also include a controller operably coupled with the receiver, the controller including a processor, an airport database, and an aircraft database. For presentation of information to a pilot, the system may include a pilot display.

The processor may include a tangible, non-transitory memory configured to communicate with the processor, the tangible, non-transitory memory having instructions stored therein that, in response to execution by the processor, cause the processor to receive the plurality of parameters from the receiver and store the received plurality of parameters within the memory. For accurate calculations, the processor may reference the aircraft database and the airport database then calculate at least one of: a nose gear arc, a start turn point, a distance to start turn point, a target turn speed, a commanded nose wheel steering angle, and an end turn point, each of the calculations based on 1) the at least one parameter of the received plurality of parameters, 2) at least one data referenced from the aircraft database, 3) at least one data referenced from the airport database, and 4) the instructions stored in the memory, at least one instruction to ensure each aircraft wheel maintains a position on a prepared surface.

For communicating the data to a pilot, the processor may generate a plurality of indicators based on the calculation, the plurality of indicators including at least one of a Nose Wheel Steering (NWS) angle indicator based on a received nose gear angle, a start turn indicator representative of the start turn point, a distance indicator representative of the distance to start turn point, a target turn speed indicator, a required turn arc representative of the commanded nose wheel steering angle, and an end turn indicator representative of the end turn point. The processor may further display, via the pilot display, at least one of the plurality of indicators.

In a further aspect a method for displaying a taxi oversteering direction may comprise receiving a plurality of parameters from a receiver, the plurality of parameters including one of: an aircraft parameter, an environment parameter, a position parameter and a path parameter and storing the received plurality of parameters within a memory.

The method may include referencing an aircraft database and an airport database and calculating at least one of: a nose gear arc, a start turn point, a distance to start turn point, a target turn speed, a command nose wheel steering angle, and an end turn point, each of the calculations based on 1) at least one parameter of the received plurality of parameters, 2) at least one data referenced from the aircraft database, 3) at least one data referenced from the airport database, and 4) a set of instructions stored within the memory, at least one instruction of the set of instructions to ensure each aircraft wheel maintains a position on a prepared surface.

The method may further include generating a plurality of indicators based on the calculation, the plurality of indicators including at least one of a Nose Wheel Steering (NWS) angle indicator based on a received nose gear angle included in the aircraft parameter, a start turn indicator representative of the start turn point, a distance indicator representative of the distance to start turn point, a target turn speed indicator, a required turn arc representative of the command nose wheel steering angle, and an end turn indicator representative of the end turn point and displaying at least one of the plurality of indicators on a pilot display.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
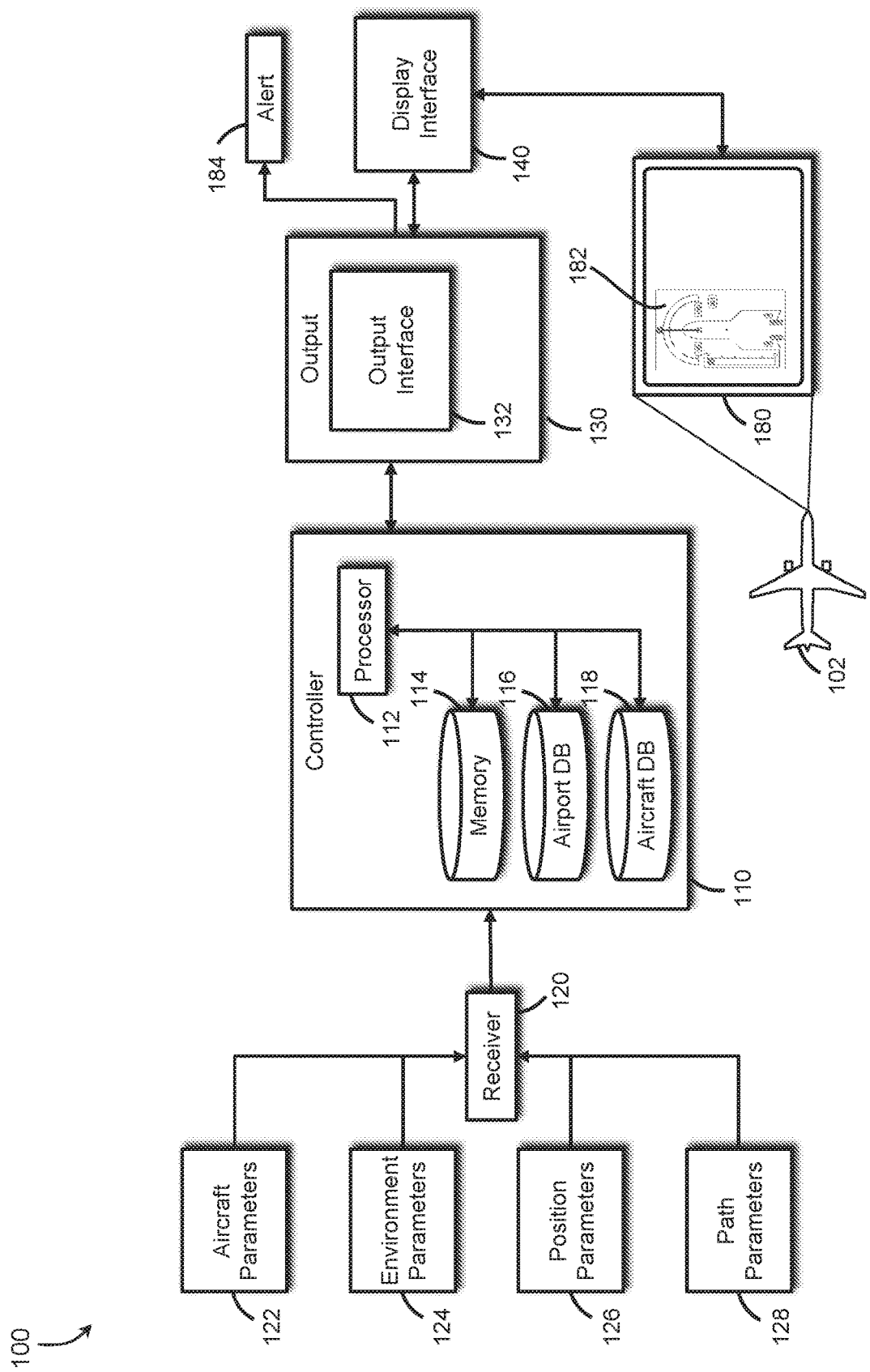
FIG. 1 is a diagram of a system for displaying a taxi oversteering direction guidance in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method for display of judgmental oversteering taxi data that receives a plurality of parameters from aircraft, environmental, position and path sources and determines and displays accurate oversteering data to a pilot. The system enables the pilot to make a variety of taxi turns confident that all aircraft wheels remain on a prepared surface. Aircraft sources include data associated with the aircraft including whether the aircraft has steerable body gear. The environmental parameters include weather, surface friction, and additional data applicable to a turning radius of an aircraft. Position data includes GNSS data to accurately position the aircraft aligned with the taxiways. Path data includes an assigned ATC clearance as well as taxiway data associated with the assigned taxi route. The method compares each of these received variables with stored database information to ensure the aircraft maintains a safe position on the prepared surface during a turn.

| REFERENCE CHART | |
|---|---|
| 100 | System Overview |
| 102 | Aircraft |
| 110 | Controller |
| 112 | Processor |
| 114 | Memory |
| 116 | Airport Database |
| 118 | Aircraft Database |
| 120 | Receiver |
| 122 | Aircraft Parameters |
| 124 | Environment Parameters |
| 126 | Position Parameters |
| 128 | Path Parameters |
| 130 | Output |

-continued

REFERENCE CHART

| | |
|---|---|
| 132 | Output Interface |
| 140 | Display Interface |
| 180 | Pilot Display |
| 182 | Steering Graphic |
| 184 | Alert |
| 200 | System Detail View |
| 300 | System Flowchart |
| 302 | Receive Aircraft Parameters |
| 304 | Receive Environment Parameters |
| 306 | Receive Position Parameters |
| 308 | Receive Path Parameters |
| 310 | Calculate Turn Data |
| 312 | Update Parameters Calculations |
| 314 | Start Turn Point in Range? |
| 316 | Display Distance to Turn Bar |
| 318 | Start Turn Point Within FOV? |
| 320 | Display Start Turn Indicator |
| 322 | Start turn Point Range = Zero? |
| 324 | Display Required Turn Arc |
| 326 | End Turn Point in FOV? |
| 328 | Display End Turn Indicator |
| 330 | End Turn Range = Zero? |
| 332 | Shift Required Turn Arc to Zero |
| 400 | Steering Graphic Detail |
| 410 | Aircraft Outline |
| 412 | Main Gear |
| 414 | Nose Gear |
| 416 | Body Gear |
| 418 | NWS Angle |
| 420 | Steering Angle Scale |
| 422 | Distance Indicator |
| 426 | NWS Angle Indicator |
| 430 | Target Groundspeed Indicator |
| 500 | Airport Diagram |
| 510 | Taxiway Delta |
| 512 | Delta Taxi Line |
| 514 | DE Turn Line |
| 520 | Taxiway Echo |
| 522 | Echo Taxi Line |
| 526 | Angle of Required Turn |
| 532 | Start Turn Point |
| 534 | End Turn Point |
| 600 | Taxiway Diagram |
| 604 | Inside Taxiway Edge |
| 606 | Inside Taxiway Radius |
| 614 | Nose Gear Arc |
| 616 | Nose Gear Radius |
| 624 | Inside Main Gear Arc |
| 626 | Inside Main Gear Radius |
| 634 | Outside Main Gear Arc |
| 636 | Outside Main Gear Radius |
| 644 | Nose Arc |
| 646 | Nose Radius |
| 654 | Wingtip Arc |
| 656 | Wingtip Radius |
| 664 | Horizontal Stabilizer Arc |
| 666 | Horizontal Stabilizer Radius |
| 680 | Start Position |
| 682 | End Position |
| 700 | Turn Diagram |
| 710 | Turn Center |
| 720 | Aircraft Longitudinal Axis |
| 800 | Pre-Turn Steering View |
| 810 | Start Turn Indicator |
| 812 | End Turn Indicator |
| 814 | Distance to Turn Start Bar |
| 816 | Required Turn Arc |
| 900 | Initial Turn View |
| 1000 | Final Turn View |
| 1100 | End of Turn View |
| 1200 | Method Flowchart |

FIG. 1 System

Figure 2:
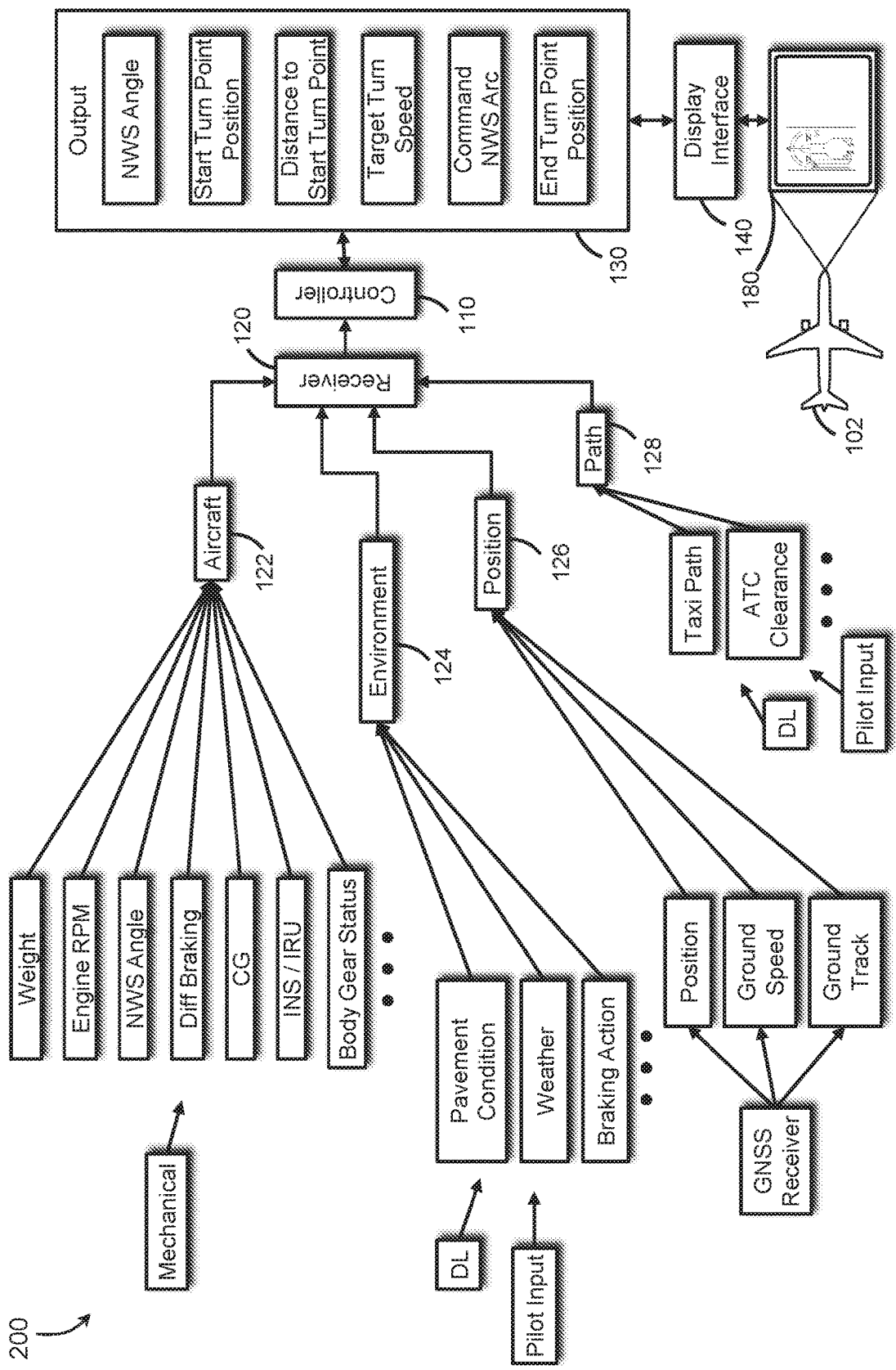
FIG. 2 is a diagram of a system detail view in accordance with an embodiment of the inventive concepts disclosed herein.

Referring now to FIGS. 1 and 2, overview and detail diagrams of a system for displaying a taxi oversteering direction guidance 100 in accordance with an embodiment of the inventive concepts disclosed herein is shown. A system 100 for displaying a taxi oversteering direction generally may receive inputs from a plurality of sources and use those inputs to determine and display accurate taxi direction to a pilot of an aircraft 102. The system 100 may include a controller 110 operatively coupled with the receiver. The controller 110 may further include a processor 112, a memory 114, an airport database 116 and an aircraft database 118.

A receiver 120 may function to receive inputs from a plurality of parameters from a variety of sources including aircraft parameters 122, environment parameters 124, position parameters 126, and path parameters 128. The controller 110 may send and receive data to an output 130 including an output interface 132 in data communication with a display interface 140 directly in data communication with a pilot display 180. Within the pilot display 180, a steering graphic 182 may function to communicate the processor 112 information to the pilot.

Also, an alert 184 may receive an input from the output 130 to alert the pilot in certain situations. In one embodiment of the inventive concepts disclosed herein, the alert 184 may function as an audio source of information for the pilot to anticipate, initiate, maintain, and finish a turn. The controller 110 may send a series of audible tones or a voice command to the alert 184 to alert the pilot of the distance to turn, start of turn, angle of turn, and commencement of the turn. In one embodiment, the alert may include a warning of an excessive groundspeed or impending wheel departure from the prepared surface.

In one embodiment of the inventive concepts disclosed herein, the aircraft parameters 122 may include "current status" details associated with the aircraft as the aircraft may move upon the prepared surfaces of the airport. For example, one aircraft parameter may include a weight of the aircraft. The aircraft weight may be one parameter (of many) which may directly affect the turning radius of the aircraft at a specific speed. While the aircraft weight may change over time, the slight changes may greatly affect the radius. Additional aircraft parameters 122 useful to the controller 110 may include an engine status, an engine speed, a current NWS angle, a current body gear steering angle, a current brake application, a center of gravity, an aircraft identification, an available lighting onboard the aircraft, an inertial acceleration, an inertial deceleration, and a rate of turn. For example, should the pilot apply differential braking while simultaneously applying asymmetric thrust, the turn radius may be greatly reduced.

In one embodiment of the inventive concepts disclosed herein, the environment parameters 124 may include transitory environmental conditions which may affect the turning capability of the aircraft 102. For example, some environment parameters 124 may include a visibility, a temperature, a windspeed and direction, a precipitation type, a prepared surface type, a braking action, a daylight level, an automated weather report, an altitude, and a data link weather report.

In one embodiment of the inventive concepts disclosed herein, the position parameters 126 may include a position obtained from a Global Navigation Satellite System (GNSS), a position based on a reception from a ground-based emitter, a ground speed, an acceleration, a deceleration, and a vector (e.g., GPS ground track).

In one embodiment of the inventive concepts disclosed herein, the path parameters 128 may include those parameters associated with an expected ground track of the aircraft 102. Some path parameters may include an Air Traffic Control (ATC) clearance route, an ATC clearance limit, a data link clearance, a type of pavement under and ahead of the aircraft, and a taxi lighting status.

Between the controller 110 and the pilot display 180, the data communication may be indicated as a two-way communication path allowing for pilot input to the controller via a user interface (e.g., touchscreen) associated with the pilot display which may offer an interactive version of the steering graphic 182. This interactivity may offer the pilot a data communication ability with the controller to command a variety of aspects of the system 100.

Within the controller 110, the processor 112 may interact with each of the memory 114, the airport database 116, and the aircraft database 118. In one embodiment of the inventive concepts disclosed herein, the memory 114 may include a tangible, non-transitory memory configured to communicate with the processor, the tangible, non-transitory memory having instructions stored therein that, in response to execution by the processor, cause the processor to execute to commands of the system 100.

In one embodiment of the inventive concepts disclosed herein, the system 100 may be a standalone hardware addition to an existing platform where the display interface 140 may interact with and supply graphic information to existing cockpit displays. Alternatively, the controller 110 may be a portion of or be incorporated within an existing Flight Control Computer (FCC) onboard the aircraft 102. In this alternative, the system 100 may be incorporated within current computing power of an existing FCC and receive parameter inputs from the receiver 120 to determine the outputs.

The airport database 116 may include a plurality of data associated with each airport. In one embodiment of the inventive concepts disclosed herein, the airport database 116 may include high resolution data associated with each taxiway and runway available to the pilots of aircraft 102. For example, an airport diagram may include details of each ramp, taxiway, and runway associated with an airport. These details may contain additional parameters including, for example, a radius of a specific turn between two taxiways or a width of a taxiway. In this manner, the system 100 may reference the airport database 116 to obtain each detail of prepared surfaces and associated position of each detail. All these data may be available to the processor 112 in calculating the various outputs to assist the pilot.

The aircraft database 118 may include such details associated with each aircraft in which the system 100 may be installed. Similar in nature to the aircraft parameters 122, the aircraft data base 118 may include data related to each aircraft. For example, the aircraft database 118 may include an aircraft type including data defining a plurality of radii representing a speed referenced turn radius of at least one of a nose gear, an inside main gear, an outside main gear, a nose, a wingtip, and a horizontal stabilizer of the at least one aircraft type. More specifically, a radius of each wheel of the aircraft at a plurality of speeds may be included in the aircraft database 118 and available to the processor.

FIG. 2 Detail Inputs

Referring now to FIG. 2, a diagram of a system detail view in accordance with an embodiment of the inventive concepts disclosed herein is shown. A detail view 200 of the system 100 may offer insight on a basis of the plurality of parameters useable by the controller 110 to calculate turn data and generate the various indicators.

In one embodiment of the inventive concepts disclosed herein, the aircraft parameters 122 may be of mechanical origin including an input from an aircraft Engine-Indicating and Crew-Alerting System (EICAS) offering current parameters such as the aircraft weight and engine RPM. Also, inertial reference unit (IRU) and an Inertial Navigation System (INS) may offer acceleration data to the controller 110.

In one embodiment of the inventive concepts disclosed herein, the system 100 may include aircraft parameter inputs from the plurality of sources including factors which may influence a turn radius of a taxiing aircraft. Such factors may include an angle of a nose wheel steering (NWS) axle. Many aircraft are equipped with some variance of an ability to turn the nose wheel and steer the aircraft to maintain a desired direction. This NWS may be unpowered in the case of a smaller aircraft as well as maintaining a sophisticated power structure including hydraulic and electric power to position the nose wheel at the pilot commanded angle relative to the aircraft longitudinal axis.

In addition to NWS, variable power settings of wing mounted engines may influence an aircraft turn radius. For example, a Boeing 747 with four main engines may increase power on an outboard engine away from the direction of turn to enable a smaller realized radius of turn. Also, a center of gravity (CG) location may influence the radius of turn of a large aircraft. An aft CG may function to lessen the downward force on the nose gear lessening an ability of the nose gear wheels to grip the pavement and increasing a slippage of the nose gear tires as the NWS is turned in a direction. Similarly, aircraft weight may factor in the radius of turn. A heavy aircraft may be more difficult to turn as the momentum of the heavy object may desire to continue in its direction of travel.

In one embodiment of the inventive concepts disclosed herein, the environment parameters 124 may include those received via a pilot input via, for example, a weather page of the Flight Management System (FMS). In this manner, the pilot may indirectly interact with the controller 110 via inputs to the FMS or more directly interact via inputs to a touch screen on the pilot display 180. Similarly, a data link input may be directly received as an environment parameter via a data link Automatic Terminal Information Service (ATIS) or a weather report received via data link.

In one embodiment of the inventive concepts disclosed herein, the position parameters 126 may include position signals received from a GNSS constellation offering accurate position data in most locations and situations. Alternatively, a ground-based positioning system may offer equal or greater positioning accuracy where individual airports may offer positioning transmission signals to accurately position the aircraft 102 on the airfield. Regardless of the source, position parameters may include ground speed and ground track to offer the controller 110 accurate information with which to calculate the outputs 130.

In some embodiments, the path parameters 128 may be generated via a pilot input to the FMS or directly to the controller 110 via the pilot display 180. Additionally, the system 100 may command a data link input of the ATC clearance as received by, for example, an onboard data link communicating with ATC.

In one embodiment of the inventive concepts disclosed herein, the outputs 130 may include calculations generated by the controller 110 and translated into indicators able to be sensed (visually, aurally) by the pilot.

The calculation outputs may include a nose gear arc, a start turn point, a distance to start turn point, a target turn speed, a commanded nose wheel steering angle, and an end turn point, each of the calculations based on 1) the at least one parameter of the received plurality of parameters, 2) at least one data referenced from the aircraft database, 3) at least one data referenced from the airport database, and 4) the instructions stored in the memory, at least one instruction to ensure each aircraft wheel maintains a position on a prepared surface.

Once the controller 110 makes the calculations, the controller 110 may translate the calculations into a plurality of indicators based on the calculation. The plurality of indicators may include NWS angle indicator based on a received nose gear angle, a start turn indicator representative of the start turn point, a distance indicator representative of the distance to start turn point, a target turn speed indicator, a required turn arc representative of the commanded nose wheel steering angle, and an end turn indicator representative of the end turn point.

In one embodiment of the inventive concepts disclosed herein, the display interface 140 may translate the indicators to actual graphics available to the pilot display 180. The steering graphic 182 (as well as lights, aural direction, text direction) may communicate the information to the pilot.

FIG. 3 Logic Flow

Figure 3:
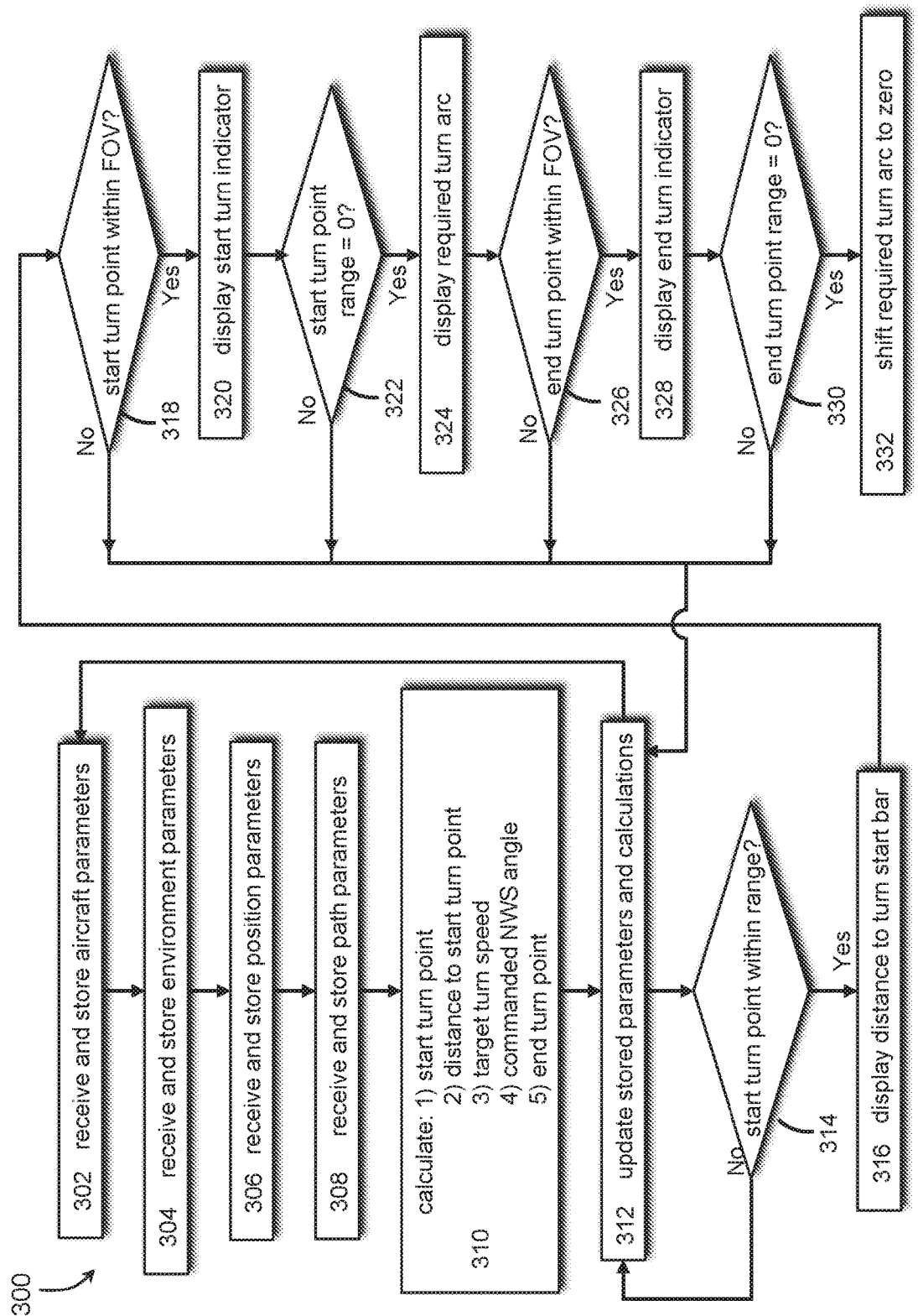
FIG. 3 is a diagram of a system flowchart exemplary of an embodiment of the inventive concepts disclosed herein.

Referring now to FIG. 3, a diagram 300 of a system flowchart exemplary of an embodiment of the inventive concepts disclosed herein is shown. In operation, the system 100 may function to receive the plurality of parameters from the receiver including receiving and storing aircraft parameters at a step 302, receiving and storing environment parameters at a step 304, receiving and storing position parameters at a step 306, and receiving and storing path parameters at a step 308. This reception of parameters may not function as a single event. The reception and storage may be continuous and as each parameter is received, the system 100 may update the received data within the memory 114.

To enable the system 100 to calculate accurate data, the system 100 may reference the airport database 116 and the aircraft database 118 to receive a plurality of data associated with each of the aircraft and the airport.

The system 100 may calculate turn data at a step 310 including calculation of a nose gear arc, a start turn point, a distance to start turn point, a target turn speed, a commanded nose wheel steering angle, and an end turn point. Here, each of the calculations may be based on 1) the received plurality of parameters, 2) the data referenced from the aircraft database, 3) the data referenced from the airport database, and 4) the instructions stored in the memory. The instructions stored in the memory may function to command the controller to make the calculations to ensure each aircraft wheel maintains a position on a prepared surface at all times.

The system 100 may generate a plurality of indicators based on the calculation, the plurality of indicators including a nose wheel steering (NWS) angle indicator based on a received nose gear angle, a start turn indicator representative of the start turn point, a distance indicator representative of the distance to start turn point, a target turn speed indicator, a required turn arc representative of the commanded nose wheel steering angle, and an end turn indicator representative of the end turn point.

The system 100 may update stored parameters and calculations at a step 312 in order to maintain the most accurate information within the memory available to the controller 110. The system 100 may display the various indicators based on where the aircraft 102 is relative to the turn points.

The field of view (FOV) of the steering graphic 182 may be of limited range allowing accurate display of the turn indicators while limiting extraneous clutter. The system may display, via the pilot display 180, at least one of the plurality of indicators based on the calculations.

The system may query if the start turn point is within range at a step 314. If the result is negative, the logic may return to update the stored parameters and calculations at step 312. Here, range may be defined as the range from the nose gear of the aircraft to the start turn point. Best seen in FIG. 8, the distance to start turn bar may be inhibited while the aircraft is more distant from the start turn point. As the aircraft approaches the start turn point and the start turn point is within a scale of the distance indicator, the system 100 may display the distance to turn bar at a step 316.

The system 100 may query if the start turn point is within the FOV at a step 318 of the steering graphic 182. If the result is negative, the logic may return to update the stored parameters and calculations at step 312. Should the start turn point be outside the FOV, the system may delay displaying the start turn indicator. Once within the FOV, the system 100 may display the start turn indicator at a step 320 on the steering graphic 102.

As the aircraft 102 proceeds closer to the start turn point, the range will decrease. The system 100 may continuously query if the start turn point range reaches zero at a step 322. If the result is negative, the logic may return to update the stored parameters and calculations at step 312. Should the result be positive, the system 100 may display a required turn arc at a step 324. During the turn, the system 100 may query if the end turn point is within the FOV at a step 326. If the result is negative, the logic may return to update the stored parameters and calculations at step 312. If the result is positive, the system 100 may display the end turn indicator at a step 328.

At a step 330, the system 100 may query if the range to the end turn point reaches zero. If the result is negative, the logic may return to update the stored parameters and calculations at step 312. Should the result be positive, the system 100 may shift the required turn arc to zero at a step 332.

Figure 4:
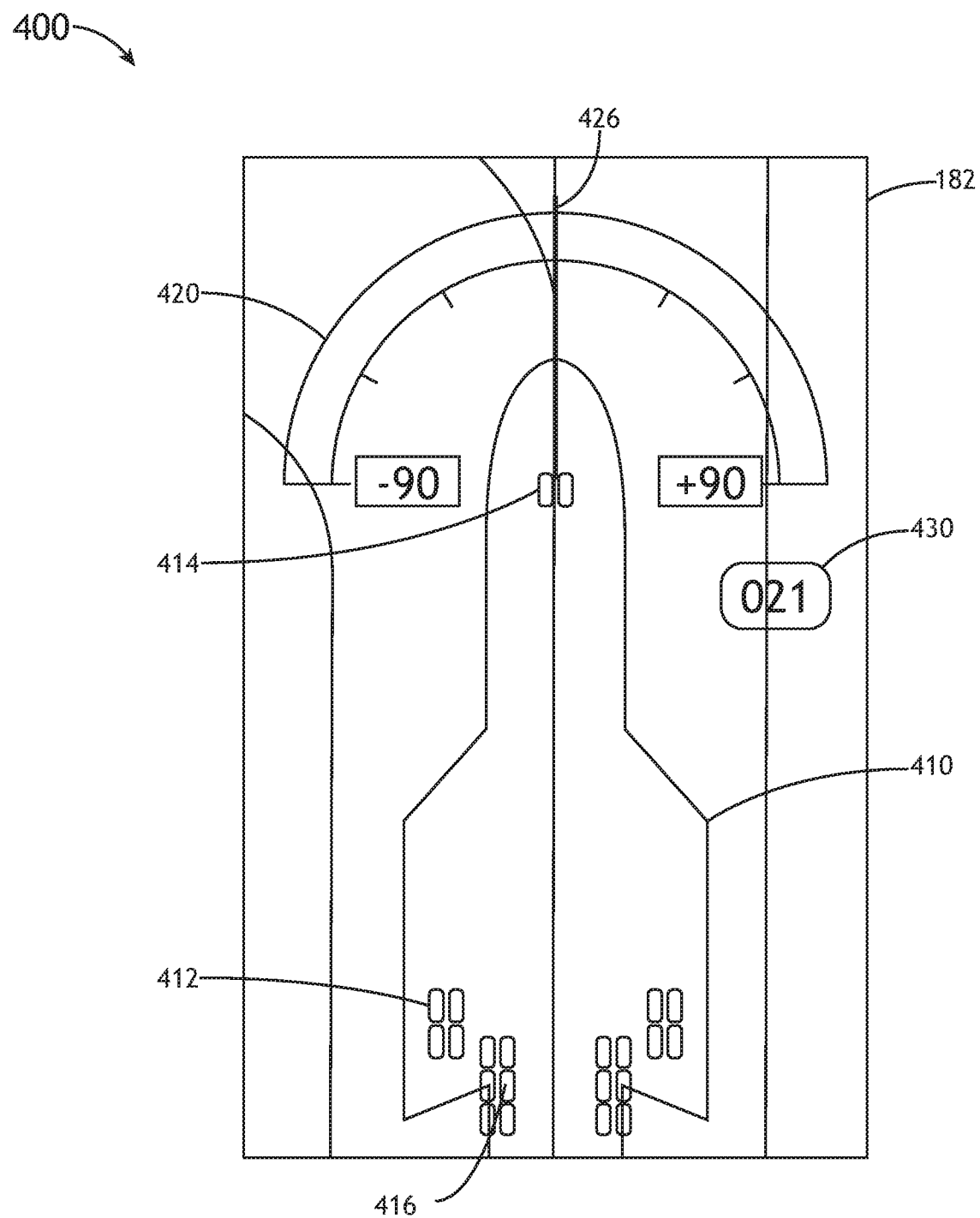
FIG. 4 is a diagram of a pilot display exemplary of one embodiment of the inventive concepts disclosed herein.

FIG. 4 Steering Graphic

Referring now to FIG. 4, a diagram of a pilot display exemplary of one embodiment of the inventive concepts disclosed herein is shown. A diagram 400 of the pilot display 182 may indicate a plurality of indicators the system 100 may display to the pilot for accurate judgmental oversteering solutions. The steering graphic 182 in FIG. 4 may indicate a view before the aircraft is within range of a turn point. Here, a top-down georeferenced representation of the taxiing aircraft 102 and the airport surface environment, including centerlines, ramp surfaces, runway surfaces, taxi surfaces, hold lines, and identifying names. The taxiing aircraft 102 may be displayed as a properly scaled aircraft outline 410 of the aircraft type and may also include the location of each landing gear including a main gear 412, a nose gear 414, and a body gear 416 (if equipped). For those landing gear elements that are steerable (e.g. the nose gear and body gear) the steering graphic may reflect the actual steering angle on a NWS angle indicator 426. The top-down view may provide the flight crew with a real-time indication of the landing gear geometry in relation to the taxiing surfaces.

Because the steering graphic 182 is georeferenced, the turn initiation and termination points may be accurately displayed when within the FOV. The presentation of the two points may be differentiated to allow the flight crew to easily distinguish the turn start point from the end turn point. A steering angle scale 420 and a target groundspeed indicator 430 may function to command the pilot to maintain a specific target groundspeed to aid the flight crew in completing the turn.

Figure 5:
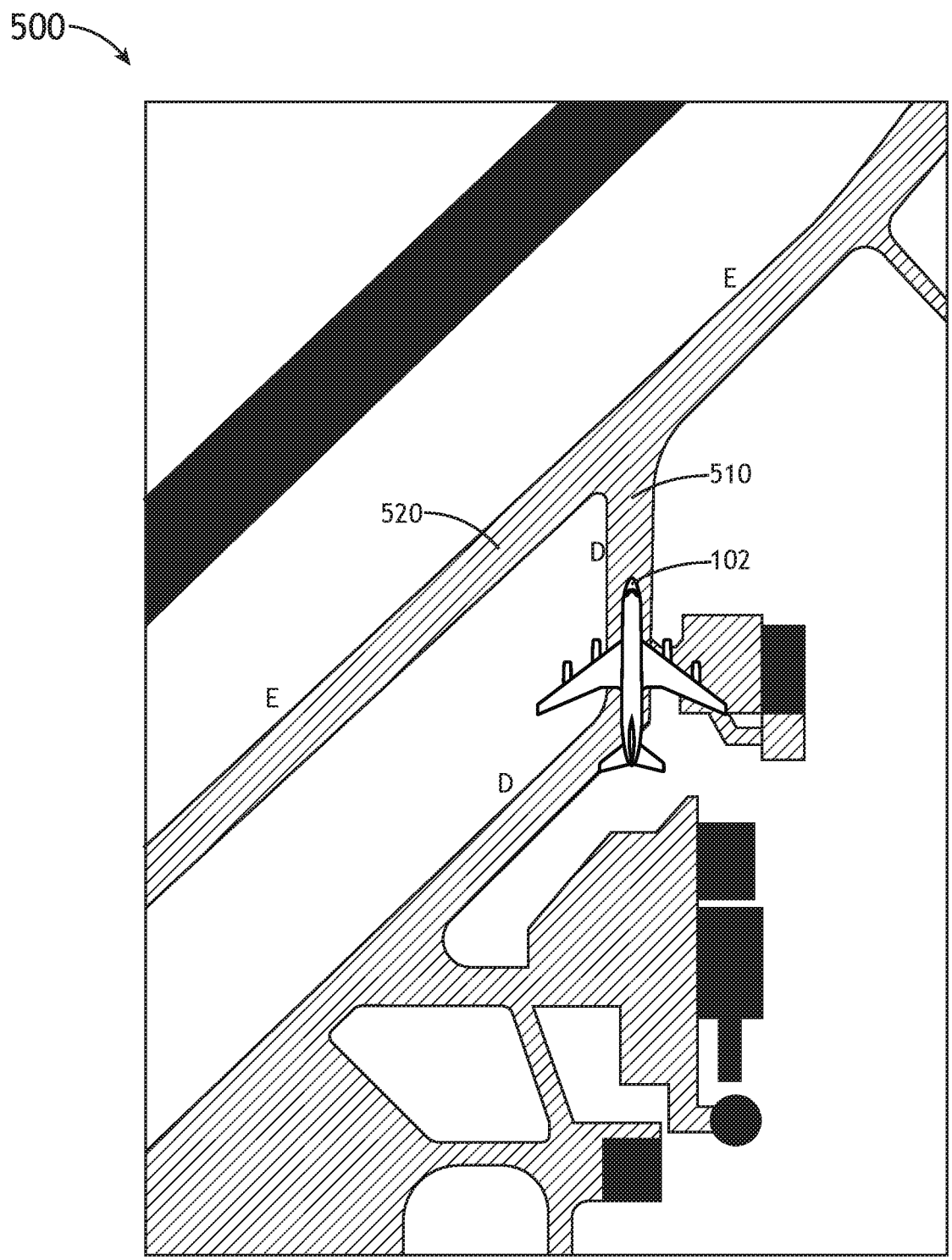
FIG. 5 is a diagram of a possible taxi route in accordance with one embodiment of the inventive concepts disclosed herein.

FIG. 5 Airport Diagram

Referring now to FIG. 5, a diagram of a possible taxi route in accordance with one embodiment of the inventive concepts disclosed herein is shown. For reference, FIG. 5 may indicate a partial airport diagram 500 of taxi routes associated with an airfield. Here, one possible taxi route may include the aircraft 102 assigned to taxi north on taxiway Delta 510 and turn left on taxiway Echo 520.

FIG. 6 Turn Detail

Figure 6:
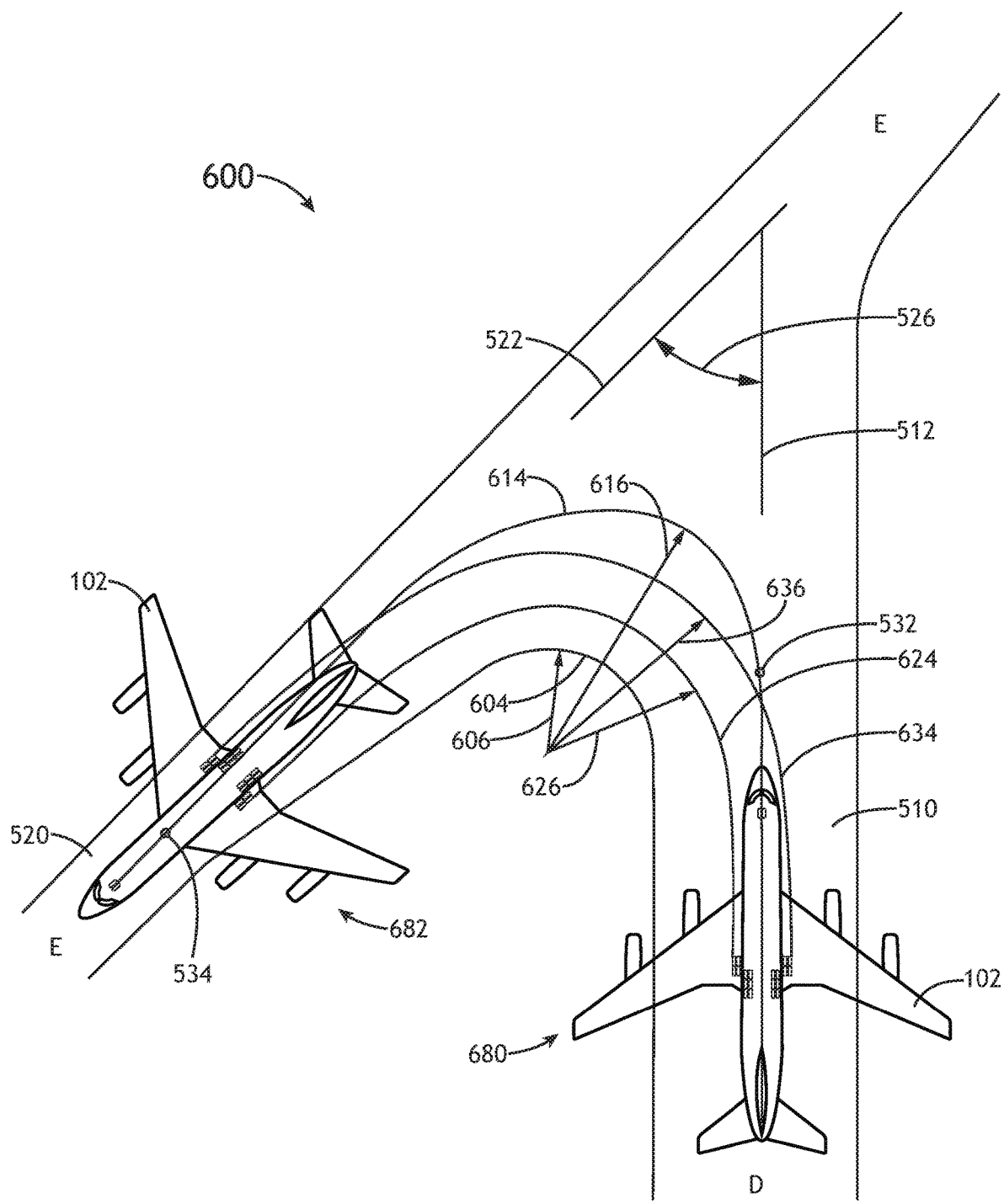
FIG. 6 is a diagram of an exemplary aircraft turn detail in accordance with one embodiment of the inventive concepts disclosed herein.

Referring now to FIG. 6, a diagram of an exemplary aircraft turn detail in accordance with one embodiment of the inventive concepts disclosed herein is shown. The detail diagram 600 may indicate a variety of arcs and angles associated with the exemplary left turn from Delta 510 to Echo 520. Each of these airport related data may be examples of data stored within the airport database 116.

Each taxiway may have a taxiway centerline shown here as a delta taxi line 512 and an echo taxi line 522 with an associated angle of required turn 526 between them. Best seen in FIG. 9, and usable by smaller aircraft, a DE turn line 514 may be painted on a turn arc intersecting each of the taxiway centerlines 512 and 522.

To successfully make the left turn, aircraft 102 may transition from a start position 680 to and end position 682 without any of the wheels leaving the prepared surface. The prepared surface of the taxiway may maintain an inside taxiway edge 604 having an inside taxiway radius 606. Each of the main gear 412 may make a track along the taxiway with an inside main gear arc 624 and radius 626 and an outside main gear arc 634 and radius 636 delineating where each main gear may track during the turn. The system 100 may function to keep the inside main gear arc 624 at least outside the inside taxiway edge 604.

To keep each main gear on the prepared surface, the system 100 may calculate and direct the pilot to steer the nose gear 414 along a nose gear arc 614 between a start turn point 532 and an end turn point 534 extending the nose gear beyond the DE turn line 514. This oversteering extension may allow the large aircraft 102 to successfully navigate the turn.

Figure 7:
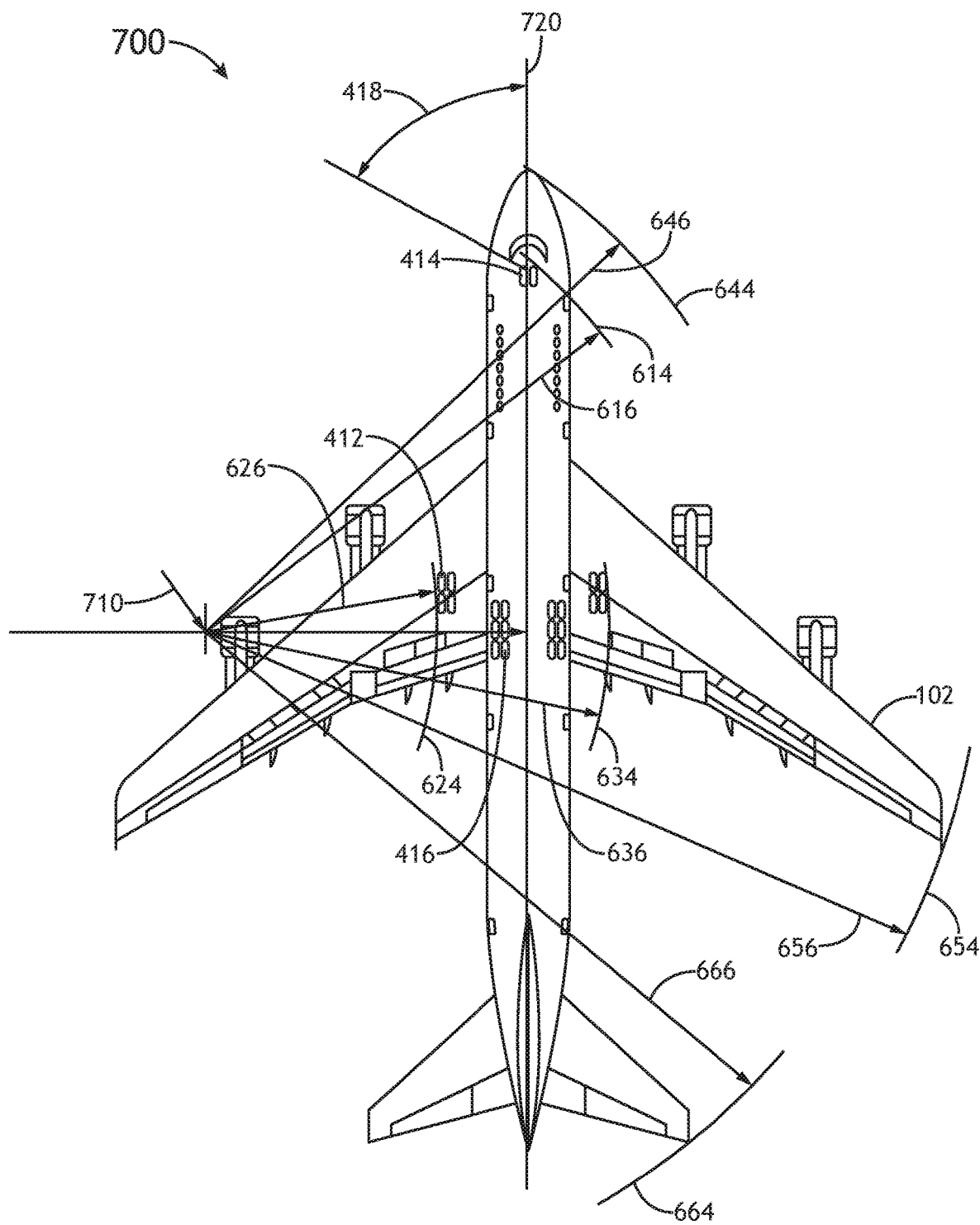
FIG. 7 a diagram of an aircraft geometry associated with one embodiment of the inventive concepts disclosed herein.

FIG. 7 Aircraft Geometry

Referring now to FIG. 7, a diagram of an aircraft geometry associated with one embodiment of the inventive concepts disclosed herein is shown. A turn diagram 700 may indicate each radius of aircraft structures as the aircraft 102 may make a left turn. Each of these arcs and radii may be examples of data stored within the aircraft database 118 and usable by the system 100 for calculation and display of the judgmental oversteering data to the pilot. Of note, many factors may increase or decrease the shown radii including speed, differential braking, body gear steering, etc. This turn diagram 700 may reference each radius with only a nose wheel steering available making a turn with a turn center 710 near an outboard engine.

A nose arc 644 and nose radius 646 may indicate a path of the aircraft nose during a turn. A wingtip arc 654 and radius 656 may indicate a path of the aircraft wingtip as the aircraft 102 makes the turn. A horizontal stabilizer arc 664 and radius 666 may indicate a path of the horizontal stabilizer during a turn.

Figure 8:
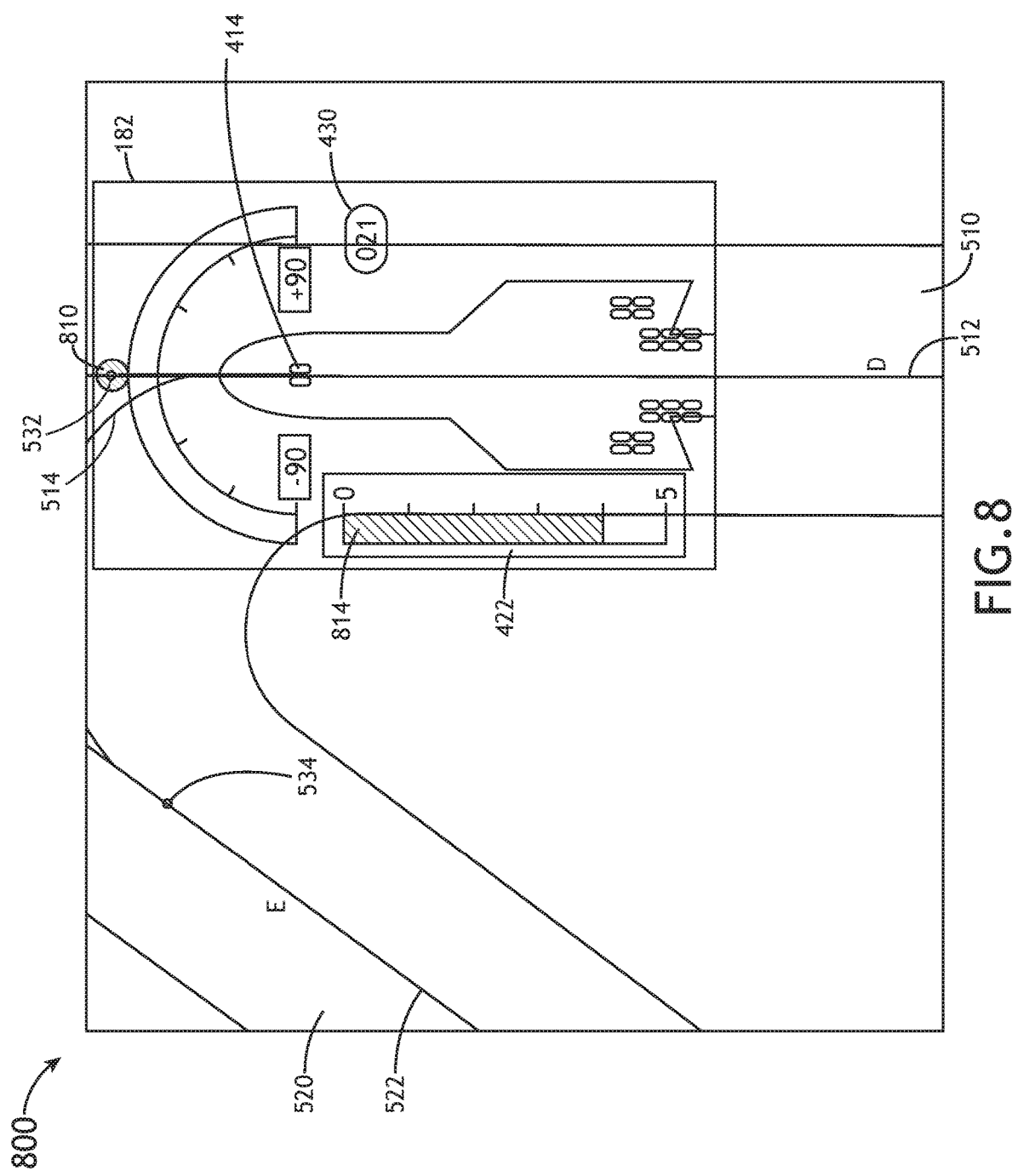
FIG. 8 is a diagram of a pilot display prior to reaching a turn point exemplary of one embodiment of the inventive concepts disclosed herein.

FIG. 8 Approaching Turn

Referring now to FIG. 8, a diagram of a pilot display prior to reaching a turn point exemplary of one embodiment of the inventive concepts disclosed herein is shown. As the aircraft 102 may approach the turn a pre-turn steering view 800 of the steering graphic 182 may show an exemplary pilot display overlain on the taxiway portion of the airport surface diagram. Of note, the pilot may see the portion of FIG. 8 outlined by the steering graphic 182 and the portion of the airport diagram scaled to reflect the taxiway below the aircraft 102. The remaining portions of taxiways Delta 510 and Echo 520 are shown for illustrative purposes.

Outside a range of the distance indicator 422, the system may refrain from display of the distance indicator to declutter the steering graphic 182. Once within range of the scale of the distance indicator 422, the system 100 may display a distance indicator 422 on a side (here, the left) of the steering graphic 182 indicating a distance bar 814 reflecting the calculated distance to the start turn point. Here, an exemplary four meters may remain until the pilot must initiate the turn. The shaded portion of the distance bar 814 may reduce to zero as the nose wheel approaches the start turn point 532.

The system 100 may display the start turn indicator 810 as it may come within the FOV of the steering graphic 182. In one embodiment of the inventive concepts disclosed herein, the start turn indicator 810 may be in the form of a shaded or colored circle. In one embodiment, the start turn indicator may be a green circle. As the nose gear 414 approaches the start turn indicator 810, for the flight crew to anticipate and prepare for the turn maneuver, the distance bar may decrease at the same rate of closure between the nose gear 414 and the start turn indicator 810.

Of note, at this point, the system 100 continues to calculate and update the end turn point 534 however, as it remains out of the FOV of the steering graphic 182, the system 100 may not display the end turn indicator.

Figure 9:
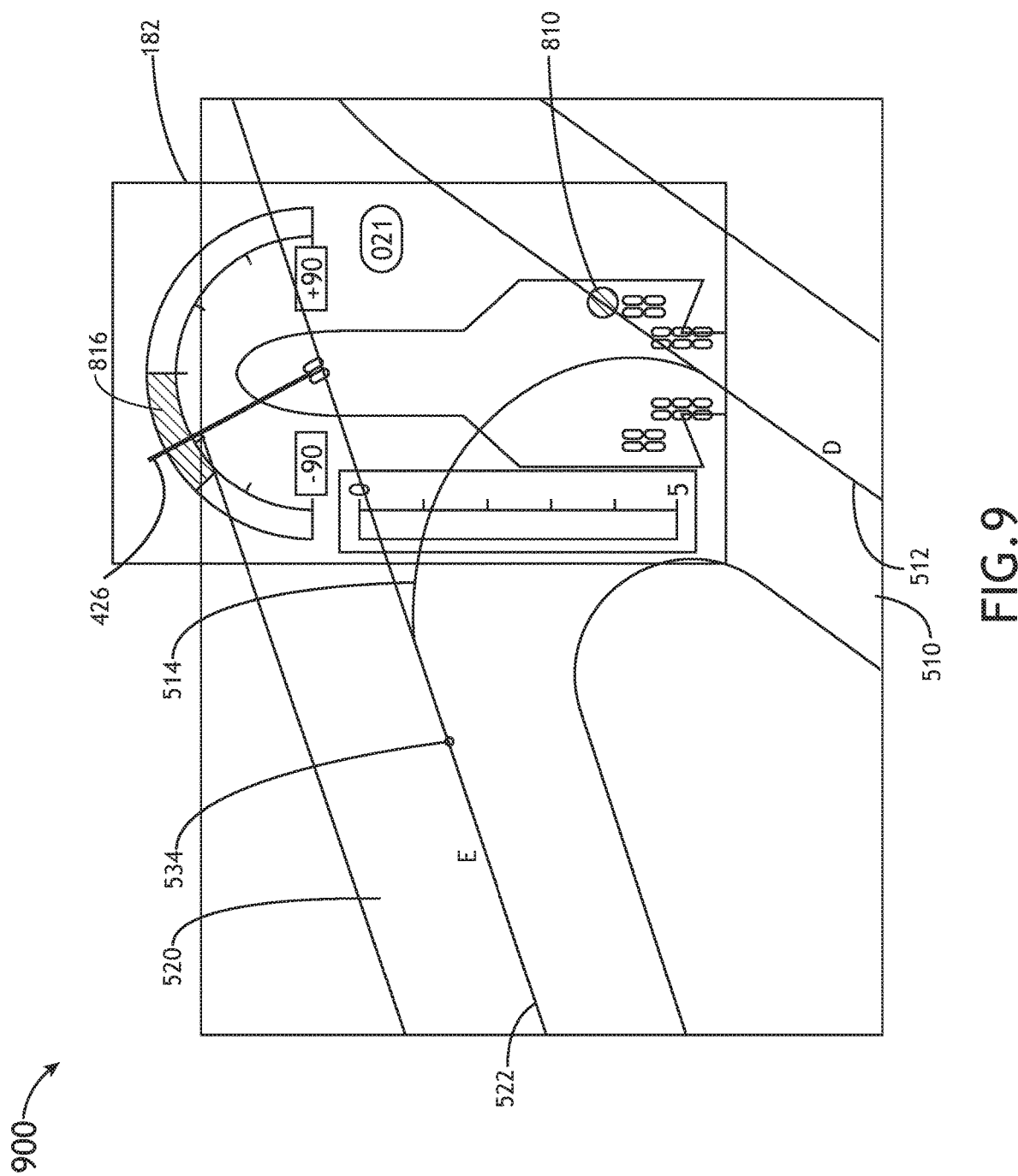
FIG. 9 is a diagram of a pilot display during a turn exemplary of one embodiment of the inventive concepts disclosed herein.

FIG. 9 Initial Turn

Referring now to FIG. 9, a diagram of a pilot display during a turn exemplary of one embodiment of the inventive concepts disclosed herein is shown. Here, an initial turn view 900 may show the aircraft 102 has passed the start turn point and the pilot is executing the turn. Prior to this view, as the aircraft 102 reaches the start turn point, the nose gear 414 and the start turn indicator 810 overlap, the system 100 may display a required turn arc 816 within the steering angle scale 420. The required turn arc 816 may indicate to the pilot a direction and a magnitude of turn angle to complete the turn. The system 100 may present a minimum and maximum angle within which the pilot should place the NWS angle 418 indicated by the NWS angle indicator 426 to successfully navigate the turn.

FIG. 10 Final Turn

Figure 10:
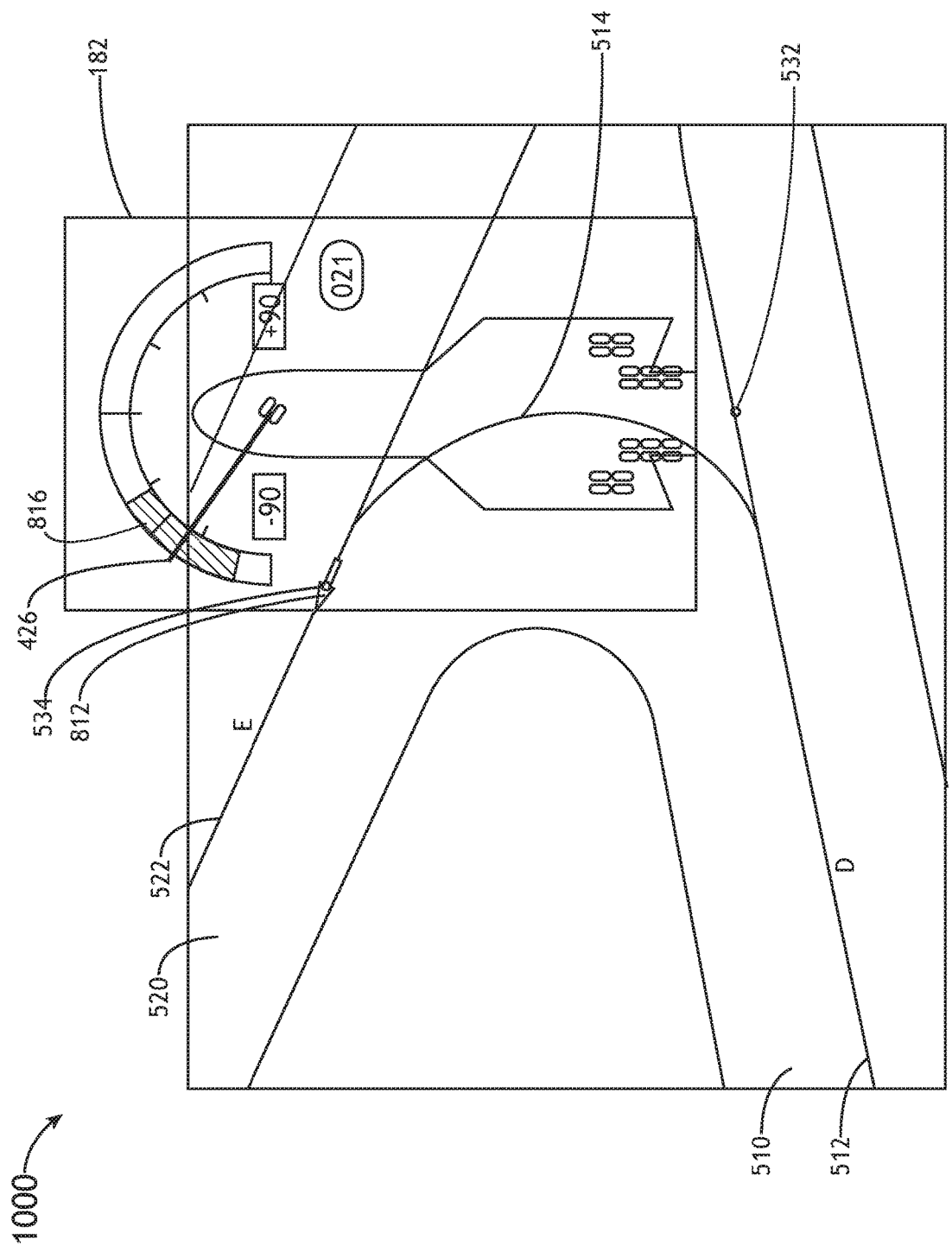
FIG. 10 is a diagram of a pilot display nearing a turn completion associated with one embodiment of the inventive concepts disclosed herein.

Referring now to FIG. 10, a diagram of a pilot display nearing a turn completion associated with one embodiment of the inventive concepts disclosed herein is shown. A final turn view 1000 may indicate an increase in turn angle commanded by the system 100. The pilot has responded by increasing the NWS angle 418 to keep the NWS angle indicator 426 within the required turn arc 816. Here, with the end turn point 534 within the FOV of the turn graphic 182, the system 100 may display the end turn indicator 812 to indicate to the pilot the turn is nearing completion. In one embodiment of the inventive concepts disclosed herein, the end turn indicator 812 may be different than the start turn indicator 810 to be easily distinguishable. On one embodiment, the system 100 may display the end turn indicator 812 as a green arrow.

Figure 11:
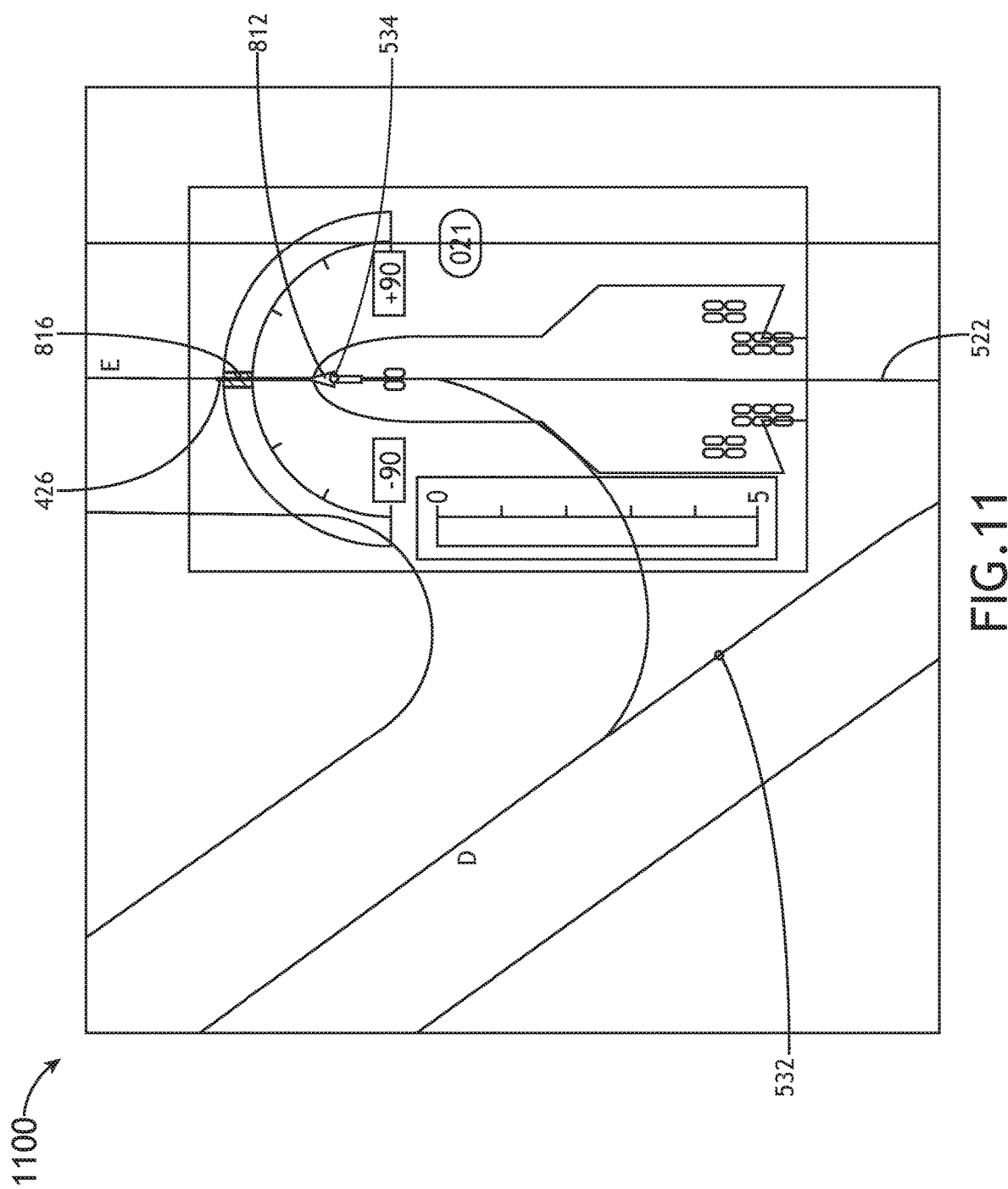
FIG. 11 is a diagram of a pilot display at a turn completion in accordance with one embodiment of the inventive concepts disclosed herein.

FIG. 11 Turn Complete

Referring now to FIG. 11, a diagram of a pilot display at a turn completion in accordance with one embodiment of the inventive concepts disclosed herein is shown. Once the aircraft 102 taxis further, the nose gear 414 may reach the end turn point 534. At this point, the system 100 may shift the required turn arc 816 to zero commanding the pilot to do the same with the NWS angle 418. The turn may then be complete and the pilot may continue to taxi straight ahead with confidence each wheel will remain on the prepared surface.

In one embodiment of the inventive concepts disclosed herein, the steering graphic may indicate NWS commands. Additional embodiments of the inventive concepts disclosed herein may detail additional commands for additional steerable gear. For example, a steerable body gear, a commanded asymmetrical thrust, and a commanded differential braking may fall directly within the scope of the inventive concepts herein.

Figure 12:
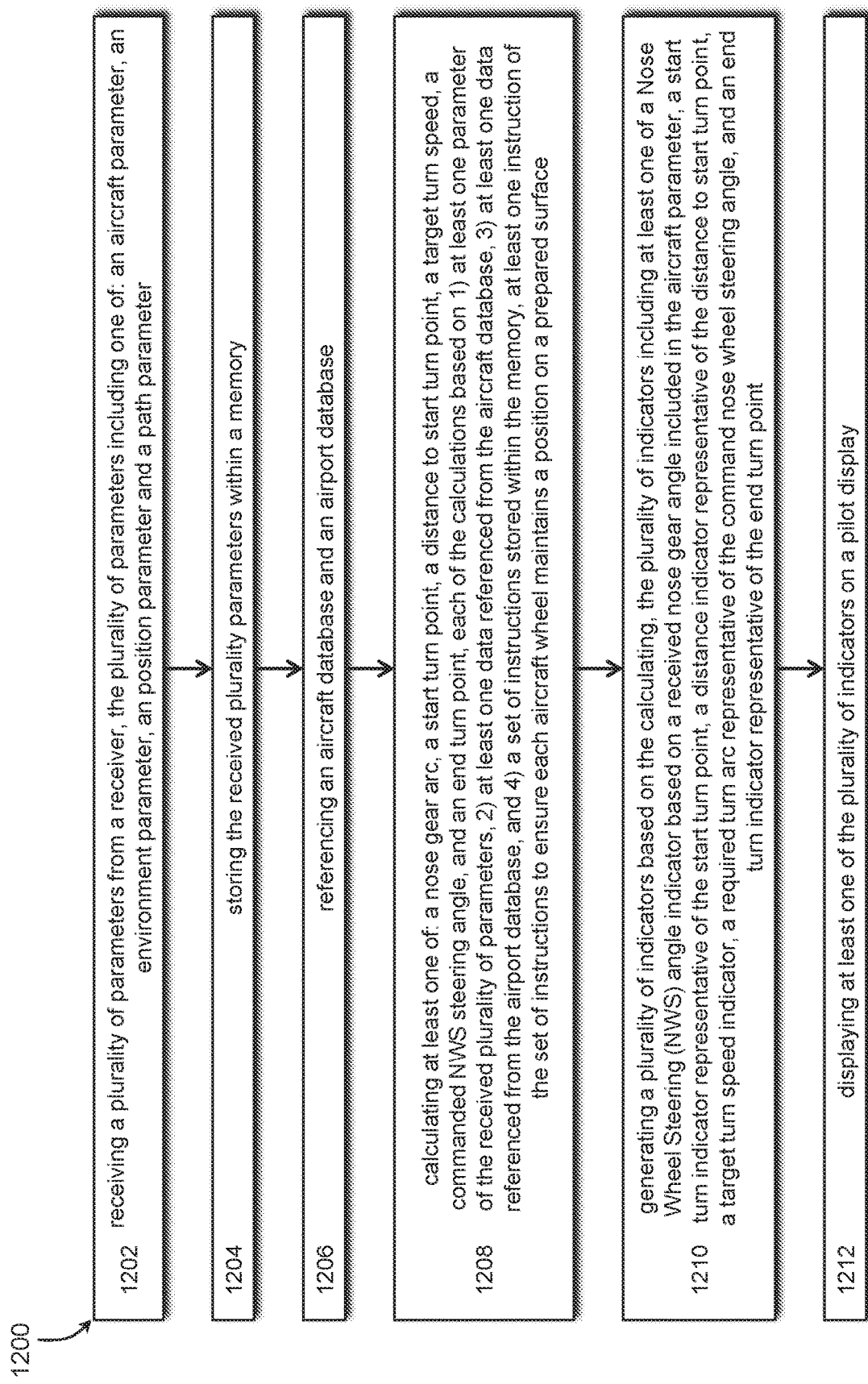
FIG. 12 is a diagram of a method flow for displaying a taxi oversteering direction in accordance with one embodiment of the inventive concepts disclosed herein.

FIG. 12 Method Flow

Referring now to FIG. 12, a diagram of a method flow for displaying a taxi oversteering direction in accordance with one embodiment of the inventive concepts disclosed herein is shown. A method flow 1200 may indicate exemplary method steps followed by the system 100. The system 100 may receive parameters at a step 1202 to include receiving a plurality of parameters from a receiver, the plurality of parameters including one of: an aircraft parameter, an environment parameter, a position parameter and a path parameter. A step 1204 may include storing the received plurality parameters within a memory. A step 1206 may include referencing an aircraft database and an airport database.

For calculations, a step 1208 may include calculating at least one of: a nose gear arc, a start turn point, a distance to start turn point, a target turn speed, a commanded nose wheel steering angle, and an end turn point, each of the calculations based on 1) at least one parameter of the received plurality of parameters, 2) at least one data referenced from the aircraft database, 3) at least one data referenced from the airport database, and 4) a set of instructions stored within the memory, at least one instruction of the set of instructions to ensure each aircraft wheel maintains a position on a prepared surface.

To generate graphics, a step 1210 may include generating a plurality of indicators based on the calculating, the plurality of indicators including at least one of a NWS angle indicator based on a received nose gear angle included in the aircraft parameter, a start turn indicator representative of the start turn point, a distance indicator representative of the distance to start turn point, a target turn speed indicator, a required turn arc representative of the commanded nose wheel steering angle, and an end turn indicator representative of the end turn point. To present the graphics to the pilot, a step 1212 may include displaying at least one of the plurality of indicators on a pilot display.

CONCLUSION

As will be appreciated from the above description, embodiments of the inventive concepts disclosed herein may provide a flight crew with information that will assist in the consistent and successful execution of a judgmental oversteering operation.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for displaying a taxi oversteering direction, comprising:
   a receiver configured to receive a plurality of parameters associated with an aircraft taxi operation, the plurality of parameters including at least one of: an aircraft parameter, an environment parameter, a position parameter and a path parameter;
   a controller operably coupled with the receiver, the controller including a processor, an airport database, and an aircraft database; and
   a pilot display;
   the processor further including a tangible, non-transitory memory configured to communicate with the processor, the tangible, non-transitory memory having instructions stored therein that, in response to execution by the processor, cause the processor to:
   receive the plurality of parameters from the receiver;
   store the received plurality of parameters within the memory;
   reference the aircraft database and the airport database;
   calculate at least one of: a nose gear arc, a start turn point, a distance to start turn point, a target turn speed, a commanded nose wheel steering angle, and an end turn point, each of the calculations based on 1) the at least one parameter of the received plurality of parameters, 2) at least one data referenced from the aircraft database, 3) at least one data referenced from the airport database, and 4) the instructions stored in the memory, at least one instruction to ensure each aircraft wheel maintains a position on a prepared surface;
   generate a plurality of indicators based on the calculation, the plurality of indicators including at least one of a Nose Wheel Steering (NWS) angle indicator based on a received nose gear angle, a start turn indicator representative of the start turn point, a distance indicator representative of the distance to start turn point, a target turn speed indicator, a required turn arc representative of the commanded nose wheel steering angle, and an end turn indicator representative of the end turn point; and display, via the pilot display, at least one of the plurality of indicators.

2. The system for displaying a taxi oversteering direction of claim 1, wherein the aircraft parameter further comprise at least one of: an aircraft weight, an engine status, an engine speed, a current NWS angle, a current body gear steering angle, a current brake application, a center of gravity, an aircraft identification, an available lighting onboard the aircraft, an inertial acceleration, an inertial deceleration, and a rate of turn.

3. The system for displaying a taxi oversteering direction of claim 1, wherein the environment parameter further comprises at least one of: a visibility, a temperature, a windspeed and direction, a precipitation type, a prepared surface type, a braking action, a daylight level, an automated weather report, altitude, and a data link weather report.

4. The system for displaying a taxi oversteering direction of claim 1, wherein the position parameter further comprises at least one of: a position obtained from a global navigation satellite system (GNSS), a position based on a reception from a ground based emitter, a ground speed, an acceleration, a deceleration, and a vector.

5. The system for displaying a taxi oversteering direction of claim 1, wherein the path parameter further comprises at least one of: an Air Traffic Control (ATC) clearance route, an ATC clearance limit, a data link clearance, a type of pavement under and ahead of the aircraft, and a taxi lighting status.

6. The system for displaying a taxi oversteering direction of claim 1, wherein the aircraft database includes data related to at least one aircraft type including data defining a plurality of radii representing a speed referenced turn radius of at least one of a nose gear, an inside main gear, an outside main gear, a nose, a wingtip, and a horizontal stabilizer of the at least one aircraft type.

7. The system for displaying a taxi oversteering direction of claim 1, wherein the airport database includes data related to at least one airport including one of a taxiway width, a taxiway direction, a taxiway heading, a taxiway prepared surface type, a taxiway capacity, a taxiway lighting, and a taxiway position.

8. The system for displaying a taxi oversteering direction of claim 1, wherein the pilot display further comprises at least one of a forward panel display, a heads up display, a series of lights, and a pilot alert.

9. The system for displaying a taxi oversteering direction of claim 8, wherein the pilot alert further comprises a warning of impending wheel departure from the prepared surface.

10. The system for displaying a taxi oversteering direction of claim 1, wherein the start turn indicator further comprises a circular graphic on the pilot display.

11. The system for displaying a taxi oversteering direction of claim 1, wherein the distance indicator comprises a scaled range bar configured to decrease as the aircraft approaches the start turn point.

12. The system for displaying a taxi oversteering direction of claim 1, wherein the target turn speed indicator comprises a maximum speed to limit a slippage of the nose wheel during a turn.

13. The system for displaying a taxi oversteering direction of claim 1, wherein required turn arc comprises a range of NWS angles within which the pilot must maintain the NWS angle to ensure all aircraft wheels remain on the prepared surface.

14. The system for displaying a taxi oversteering direction of claim 1, wherein the end turn indicator comprises an arrow shaped indicator on the pilot display.

15. The system for displaying a taxi oversteering direction of claim 1, wherein the plurality of indicators are displayed overlain on an airport surface graphic on the pilot display.

16. A method for displaying a taxi oversteering direction, comprising:

receiving a plurality of parameters from a receiver, the plurality of parameters including one of: an aircraft parameter, an environment parameter, a position parameter and a path parameter;

storing the received plurality parameters within a memory;

referencing an aircraft database and an airport database;

calculating at least one of: a nose gear arc, a start turn point, a distance to start turn point, a target turn speed, a command nose wheel steering angle, and an end turn point, each of the calculations based on 1) at least one parameter of the received plurality of parameters, 2) at least one data referenced from the aircraft database, 3) at least one data referenced from the airport database, and 4) a set of instructions stored within the memory, at least one instruction of the set of instructions to ensure each aircraft wheel maintains a position on a prepared surface;

generating a plurality of indicators based on the calculating, the plurality of indicators including at least one of a Nose Wheel Steering (NWS) angle indicator based on a received nose gear angle included in the aircraft parameter, a start turn indicator representative of the start turn point, a distance indicator representative of the distance to start turn point, a target turn speed indicator, a required turn arc representative of the command nose wheel steering angle, and an end turn indicator representative of the end turn point; and displaying at least one of the plurality of indicators on a pilot display.

17. The method for displaying a taxi oversteering direction of claim 16, wherein aircraft parameter further comprise at least one of a NWS angle limit, a current NWS angle, a body gear steering capability, a current body gear steering angle, an available lighting onboard the aircraft, a number of nose wheels, a number of main wheels, an engine status, an engine speed, an engine distance from a center of turn, a rate of turn and a number of engines.

18. The method for displaying a taxi oversteering direction of claim 16, wherein the environment parameter further comprises at least one of a visibility, a temperature, a windspeed and direction, a precipitation type, a braking action, a daylight level, an automated weather report, and a data link weather report.

19. The method for displaying a taxi oversteering direction of claim 16, wherein the position parameter further comprises at least one of a position obtained from a global navigation satellite system (GNSS), a position based on a reception from a ground based emitter, a position over time, and a vector.

20. The method for displaying a taxi oversteering direction of claim 16, wherein the path parameter further comprises at least one of an Air Traffic Control (ATC) clearance route, an ATC clearance limit, a data link clearance, a type of pavement under and ahead of the aircraft, and a taxi lighting status.

\* \* \* \* \*